US009585533B2

(12) United States Patent
Hensel et al.

(10) Patent No.: US 9,585,533 B2
(45) Date of Patent: Mar. 7, 2017

(54) VACUUM CLEANER AND METHOD FOR CLEANING A FILTER

(71) Applicant: Alfred Kärcher GmbH & Co. KG, Winnenden (DE)

(72) Inventors: Maic Hensel, Backnang (DE); Frank Fuchs, Rutesheim (DE); Julien Scholl, Waiblingen (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 610 days.

(21) Appl. No.: 13/962,630

(22) Filed: Aug. 8, 2013

(65) Prior Publication Data

US 2013/0319478 A1 Dec. 5, 2013

Related U.S. Application Data

(63) Continuation of application No. PCT/EP2012/052436, filed on Feb. 13, 2012, and a
(Continued)

(51) Int. Cl.
*A47L 9/20* (2006.01)
*A47L 9/28* (2006.01)
(Continued)

(52) U.S. Cl.
CPC ............... *A47L 9/2884* (2013.01); *A47L 9/20* (2013.01); *A47L 9/2842* (2013.01);
(Continued)

(58) Field of Classification Search
CPC ........ A47L 9/2884; A47L 9/20; A47L 9/2842; B08B 5/04; B01D 46/0067; F16K 17/042
(Continued)

(56) References Cited

U.S. PATENT DOCUMENTS 6,192,550 B1 2/2001 Hamada et al.
6,448,732 B1 * 9/2002 Block ................... A47L 9/2842
15/339

(Continued)

FOREIGN PATENT DOCUMENTS

CN 1323565 11/2001
EP 0 955 003 11/1999
(Continued)

*Primary Examiner* — David Redding
(74) *Attorney, Agent, or Firm* — Womble Carlyle Sandridge & Rice LLP (57) ABSTRACT

A vacuum cleaner is provided, including a suction inlet, a dirt collection container, a filter device, a suction conduit, a suction unit, wherein the dirt collection container is in flow communication with the suction unit via the filter device and the suction conduit and wherein the filter device has a negative pressure applied to it by the suction unit, and including an external air valve device, wherein the filter device is capable of having external air applied thereto on the clean side thereof via the external air valve device and wherein for cleaning the filter device the external air valve device is capable of being brought from a closed valve position to an open valve position and back again from the open valve position to a closed valve position, characterized by a battery device for supplying energy to the external air valve device.

17 Claims, 6 Drawing Sheets

Related U.S. Application Data continuation-in-part of application No. PCT/EP2011/052039, filed on Feb. 11, 2011.

(51) Int. Cl.
  B08B 5/04 (2006.01)
  B01D 46/00 (2006.01)
  F16K 17/04 (2006.01)

(52) U.S. Cl.
  CPC ............ B01D 46/0067 (2013.01); B08B 5/04 (2013.01); F16K 17/042 (2013.01)

(58) Field of Classification Search
  IPC .......................................................... A47L 9/20
  See application file for complete search history.

(56) References Cited

U.S. PATENT DOCUMENTS

| | | | | |
|---|---|---|---|---|
| 2005/0273969 A1* | 12/2005 | Watson | ...................... | A47L 5/14 15/344 |
| 2008/0086835 A1 | 4/2008 | Stewen et al. | | |
| 2008/0092326 A1 | 4/2008 | Morishita | | |
| 2008/0092498 A1 | 4/2008 | Stewen et al. | | |
| 2009/0000485 A1 | 1/2009 | Valentini | | |
| 2009/0205491 A1* | 8/2009 | Eckstein | ................... | A47L 9/20 95/68 |
| 2009/0205499 A1 | 8/2009 | Eckstein et al. | | |
| 2009/0271944 A1* | 11/2009 | Lovelass | ................... | A47L 5/30 15/383 |
| 2013/0239360 A1* | 9/2013 | Hensel | ................... | A47L 5/365 15/347 |

FOREIGN PATENT DOCUMENTS

| | | |
|---|---|---|
| EP | 1 410 751 | 4/2004 |
| JP | 2003-339598 | 12/2003 |
| JP | 2008-61900 | 3/2008 |
| JP | 2009-225993 | 10/2009 |
| JP | 2010-273821 | 12/2010 |
| WO | WO 2011/012479 | 2/2011 |

\* cited by examiner

VACUUM CLEANER AND METHOD FOR CLEANING A FILTER

CROSS-REFERENCE TO RELATED APPLICATIONS

The present application is a continuation of international application number PCT/EP2012/052436, filed on Feb. 13, 2012, and a continuation-in-part of international patent application number PCT/EP2011/052039, filed Feb. 11, 2011, which are incorporated herein by reference in their entirety and for all purposes.

BACKGROUND OF THE INVENTION

The invention relates to a vacuum cleaner comprising a suction inlet, a dirt collection container, a filter device, a suction conduit, a suction unit, wherein the dirt collection container is in flow communication with the suction unit via the filter device and the suction conduit and wherein the filter device has a negative pressure applied to it by the suction unit, and comprising an external air valve device, wherein the filter device is capable of having external air applied thereto on the clean side thereof via the external air valve device and wherein for cleaning the filter device the external air valve device is capable of being brought from a closed valve position to an open valve position and back again from the open valve position to a closed valve position.

The invention further relates to a method for cleaning a filter of a vacuum cleaner in which for cleaning the filter external air is applied to the filter on the clean side thereof via an external air valve device, wherein in the external air valve device a closed valve position is changed to an open valve position for filter cleaning.

SUMMARY OF THE INVENTION

In accordance with an embodiment of the invention, there is provided a vacuum cleaner which provides optimized use for a user.

In accordance with an embodiment of the invention, the vacuum cleaner comprises a battery device for supplying energy to an external air valve device.

Using a battery device, which is in particular rechargeable and comprises, for example, one or more accumulators, permits filter cleaning to be accomplished independent of a mains supply grid.

For example, filter cleaning can also be accomplished when or after the suction operation of the vacuum cleaner is turned off.

In particular, filter cleaning can then also be accomplished in a vacuum cleaner that is operated via the battery device. A vacuum cleaner that is operated via the battery device can be used in an area of application where no mains voltage is available. Such an area of application is for example a building shell. A typical issue in such areas of application is the presence of fine dust in high amounts. In the solution in accordance with the invention, filter cleaning is accomplished via the battery device, thereby maintaining optimized suction operation.

In particular, the battery device is rechargeable. Preferably, it comprises one or more accumulators. This makes the vacuum cleaner convenient to use for a user.

It is particularly advantageous for the vacuum cleaner and in particular for the suction unit to be supplied with energy via the battery device. The battery device can thereby be used for vacuum cleaning, and filter cleaning can be accomplished. During the running time of the battery device, a "self-sufficient" suction system can thereby be provided in which the suction power is optimized throughout the running time; in particular, filter cleaning is performed when required and preferably automatically.

Provision may be made for a mains voltage supply device to exist for the vacuum cleaner, in particular with the capability of adjusting or selecting whether energy is supplied via the battery device or via the mains voltage supply device. This results in a wide range of applications.

It is advantageous for a control device to be provided which controls the cleaning of the filter device by the external air valve device, wherein the filter cleaning is initiated manually or automatically and in particular time-dependently and/or depending on one or more sensor signals. The sensor signals are for example signals which measure the pressure drop across a filter of the filter device. Automatic filter cleaning allows the complexity of operation to be reduced for a user. An optimized suction result is ensured over the running time of the battery device.

It is advantageous for the same control device that controls the external air valve device to also control an electric motor device (having at least one electric motor) of the suction unit. This results in optimized operation and allows for a link to be implemented between the control of the external air valve device and the control of the electric motor device. For example, it can then be ensured that, for a filter cleaning process, by appropriate control of the electric motor device, the dirt collection container is under sufficient negative pressure so as to prevent dirt from being blown out of the dirt collection container into the surroundings.

It is further advantageous for the same control device and the battery device to be coupled, and in particular for the control device to control and/or monitor the charging and/or discharging and/or operation of the battery device. Optimized operation of the vacuum cleaner, including filter cleaning, can thereby be achieved. For example, by virtue of the corresponding control electronics, a discharge process of a rechargeable battery device can be controlled such that the load on the battery device is optimized in terms of battery capacity and/or life span. For example, the battery device comprises a fan device for cooling batteries (particularly accumulators). By use of the control device which also controls the electric motor device, said fan device can be controlled depending on the electric motor's operation. It is for example also possible, when the vacuum cleaner is turned off, for the fan device to be turned off after a time delay. In that case, when turning off the vacuum cleaner, it is in turn possible for a check to made as to whether the battery device has enough electrical energy left to continue operation of the fan device even after turning off the vacuum cleaner in order to thereby achieve defined "cooling down" of the battery device. If, for example, a filter cleaning process in which the electrical energy is provided by the battery device is to be performed after the vacuum cleaner (the suction operation of the vacuum cleaner) has been turned off, a check can be made via the control device as to whether the battery device has enough load capacity left for such a filter cleaning process to be accomplished.

In particular, the control device comprises at least one controller for controlling the electric motor device.

In an exemplary embodiment, the control device comprises a first controller which is associated with a mains voltage supply device and comprises a second controller which is associated with the battery device, wherein either the first controller or the second controller controls the electric motor device depending upon which energy supply is active. Thus, there are separate controllers for different types of energy supply which can then be optimized separately. It is thereby possible to make use of existing (commercially available) controllers.

In an embodiment, the control device comprises a motor control subunit which is signally and operatively connected to an external air valve control subunit of the control device. The external air valve control subunit provides for corresponding control of the external air valve device in order to initiate a filter cleaning process (and to correspondingly control a filter cleaning process during the filter cleaning). The motor control subunit has information which is related to the motor control and/or by which the electric motor can be controlled. By using an operative signal connection, which may be unidirectional or bidirectional, linking of external air valve control, and hence filter cleaning, with motor control can be realized. For example, it is thereby possible to prevent departure from a working point of the electric motor (a rotor of an electric motor is not accelerated at the working point) during the filter cleaning or to specifically adjust a different working point for a filter cleaning process.

In an embodiment, the motor control subunit provides for the electric motor device to be controlled such that a working point or working point range of the electric motor device is maintained for a filter cleaning process of the filter device. The vacuum cleaner can thereby be operated in an optimized and energy-saving manner (at high efficiency).

In an exemplary embodiment, a receptacle for the battery device is arranged on a circuit board on which is arranged an electronic control device for the electric motor device. The routing of electrical lines in the vacuum cleaner can thereby be minimized. A compact electronic module can be provided which has the electronic control device integrated therein and has a direct energy connection for the battery device. Where the battery device comprises a fan device, it is particularly advantageous for said fan device to be likewise arranged directly on the corresponding circuit board.

It is advantageous for the suction unit to comprise an electric motor device having at least one electric motor. In particular, the at least one electric motor is a permanent magnet-excited synchronous motor. Such a permanent magnet-excited synchronous motor has a plurality of permanent magnets that are arranged on the rotor. A permanent magnet-excited synchronous motor can in particular be operated as a brushless (EC) motor. It has a high efficiency. A long running time of the vacuum cleaner can thereby be obtained when the suction unit is powered via the battery device.

In particular, the at least one electric motor is an electronically commutated (EC) motor. Here, the necessity of brushes etc. is obviated. Corresponding coils which are arranged on a stator of the electric motor are controlled by a controller such that a rotor is rotated. In an electronically commutated motor, adjustment between the at least one electric motor and a fan of the suction unit which is driven by the at least one electric motor can be implemented in software. In principle, the working point of the at least one electric motor is the point or range where the torque delivered by the rotary motor corresponds to the torque required by the fan. At that time, a rotor of the at least one electric motor is not accelerated or decelerated. In an electronically commutated electric motor, said working point can be adjusted, and optionally varied, by software. On the one hand, this simplifies the manufacturing and assembly process of the vacuum cleaner, and it provides additional capabilities of operation and/or control. Thus, it is for example possible for one or more working points to be specifically adjusted for a filter cleaning process. When appropriately configured, the electronic circuit arrangement for controlling the at least one electric motor can also be used to control a filter cleaning process or to control or monitor the battery device.

In an embodiment, the at least one electric motor is a three-phase motor. Such an electric motor can be implemented with reduced noise and optimized efficiency.

It is advantageous for the suction unit to comprise a volute housing with an impeller rotating in said volute housing. In particular, the volute housing is provided with a tangential inlet for intake air. This results in optimized efficiency with extended running time.

In a method in accordance with invention, which is in particular carried out on a vacuum cleaner constructed in accordance with the invention, provision is made for the external air valve device to be supplied with energy via a battery device.

The method in accordance with the invention has the advantages that have already been explained in connection with the description of the vacuum cleaner constructed in accordance with the invention.

In particular, the battery device is rechargeable.

It is particularly advantageous for the battery device to supply energy to a suction unit of the vacuum cleaner and in particular to the vacuum cleaner as a whole. During the capacity time of the battery device, a self-sufficient vacuum cleaner can thereby be provided which, with filter cleaning also being accomplished, delivers an optimized suction result.

It is advantageous for a suction unit of the vacuum cleaner to comprise at least one electric motor to which energy is supplied via the battery device.

In particular, the filter cleaning is carried out automatically, for example within certain time intervals and/or when required, for example when a pressure drop across a filter of the filter device exceeds a certain threshold.

Provision may be made for the at least one electric motor to be controlled depending on the control of the external air valve device. Electric motor control and external air valve device control can thereby be coupled. Optimized suction results can thereby be achieved. For example, if an electronically commutated permanent magnet-excited synchronous motor is used as the electric motor, this can be controlled via a pulse width modulated signal. In principle, a supply voltage that is delivered by the battery device need not to be adjusted depending on the control, even for a filter cleaning process. By the coupling between electric motor control and external air valve device control, it is for example possible to specifically maintain or specifically vary a working point of an electric motor even for a filter cleaning process. For example, coupled control is used in order to still achieve a suction effect in a filter cleaning process and/or to prevent dirt from being blown out of a dirt collection container.

For example, the suction power of the suction unit is increased before the external air valve transitions to the open valve position, and is reduced again later.

In such a method, the suction power of the suction unit can be varied depending on the valve position of the external air valve. More particularly, the suction power of the suction unit is increased even before the external air valve transitions from its closed valve position to its open valve position. As a result, the negative pressure in the dirt collection container is increased before external air flows in counterflow direction through the at least one filter and enters the dirt collection container. Thus, at a time when the external air valve transitions from its closed valve position to its open valve position, a particularly high negative pressure exists in the dirt collection container. As a result, the inflowing external air causes the at least one filter to be subjected to a vigorous mechanical shock and a substantial portion of said external air passes through said filter in counterflow direction. The cleaning action on the at least one filter can thereby be enhanced. Preferably, the suction power of the suction unit is reduced again at the earliest when the external air valve moves from the open valve position to the closed valve position.

The suction power need not necessarily be increased before every filter cleaning process; for example, provision may be made for the suction power to be increased for example only before every second or before every third or generally before every nth transition of the external air valve to the open valve position, where n is an integer greater than 1; otherwise, the suction power of the suction unit assumes a constant value.

Provision may also be made for the suction power to remain increased until the external air valve has moved several times from the closed valve position to the open valve position and back again to the closed valve position. In such a configuration, the suction power is increased prior to a first transition of the external air valve to the open position and subsequently the external air valve opens and closes momentarily several times in succession; the opening time may for example be less than 0.5 seconds in each case. The suction power of the suction unit can be at an increased level during the repeated opening and closing movements of the external air valve.

In an advantageous embodiment, particularly effective filter cleaning is achieved by the suction power of the suction unit being increased prior to every transition of the external air valve to its open valve position, and being reduced later. Thus every time the external air valve opens, a particularly high negative pressure exists in the dirt collection container and the entering external air can cause the at least one filter to be subjected to particularly vigorous mechanical shocks and a substantial portion of said external air can pass through the at least one filter in counterflow direction.

For a particularly effective filter cleaning action to be achieved, it is important that, by varying the suction power of the suction unit, as high a negative pressure as possible exist in the dirt collection container when the external air valve transitions from the closed valve position to the open valve position. Advantageously, this is achieved by the suction power of the suction unit being at an increased level when the external air valve transitions to the open valve position. The suction power of the suction unit may already be reduced again during the time interval in which the external air valve assumes an open valve position.

It is, however, particularly advantageous for the suction power of the suction unit to remain increased throughout the time interval in which the external air valve is open. This makes it possible for the increase in pressure accompanying the inflow of the external air into the dirt collection container to be kept as low as possible. This in turn has the advantage that the suction operation of the vacuum cleaner is not noticeably interrupted in the user's perception during the filter cleaning process.

Preferably, the suction power of the suction unit is reduced again at the earliest when the external air valve transitions to the closed valve position. Provision may also be made for the suction power to stay increased for a short period of time even after the external air valve transitions to the closed valve position so that external air that has flowed into the dirt collection container can be sucked off with increased suction power.

The suction power of the suction unit is preferably increased by at least 10%, in particular by at least 30%, before the external air valve transitions to the open valve position.

Advantageously, the cleaning of the at least one filter is initiated manually, time-dependently or depending on a sensor signal. For example, provision may be made for a filter cleaning process to be carried out automatically at regular or irregular time intervals, with the suction power of the suction unit being increased before the external air valve transitions to the open position, and being reduced again later. Provision may be made for the external air valve to be opened and closed several times in succession at short intervals of time so that external air can enter the suction conduit in sudden bursts and be applied in sudden bursts to the at least one filter on the clean side thereof. Subsequently, the external air valve can maintain its closed valve position until, at a later point in time, a filter cleaning process is carried out again in which the external air valve is again momentarily opened and closed several times in succession. The suction power of the suction unit can assume an increased value throughout the filter cleaning process. It is, however, particularly advantageous for the suction power of the suction unit to be increased every time before the external air valve transitions to the open valve position and to then remain increased at the most until the external air valve reassumes its closed position. The suction power of the suction unit is thus varied in accordance with the opening and closing movement of the external air valve, it being increased in each case before the external air valve transitions to the open valve position.

Additionally or alternatively, provision may be made for filter cleaning to be initiated manually. This makes it possible for the user to carry out a filter cleaning process when he/she considers this necessary. If filter cleaning is initiated manually, the suction power of the suction unit is first increased and only then is the external air valve momentarily opened and closed again once or several times in succession, and the suction power of the suction unit can be varied in accordance with the movement of the external air valve. To manually initiate the filter cleaning, the vacuum cleaner may comprise a control element, such as a switch or a push button, which can be actuated by the user.

Additionally or alternatively, it may also be provided for the cleaning of the at least one filter to be initiated depending on a sensor signal. For example, the pressure in the suction conduit can be measured. When, with increasing deposition of solid particles, the flow resistance of the at least one filter increases, a pressure drop occurs in the suction conduit. If the negative pressure in the suction conduit falls below a predetermined value, filter cleaning can be initiated.

Provision may also be made for the operating noise and/or the rotational speed of the suction unit to be detected by sensors. A pressure drop in the suction conduit due to clogging of the filter causes the rotational speed of the suction unit to increase and its operating noise to change; thus, filter cleaning can be activated when a predetermined rotational speed is exceeded or when a predetermined operating noise is present, for example when a certain sound level is produced.

Also, at least one flow sensor may be used which detects suction flow in the suction conduit, for example the flow rate and/or the volumetric flow. If the suction flow falls below a predetermined value, filter cleaning can be initiated.

It is particularly advantageous if the pressure drop at the filter is determined with the aid of sensors. To this end, pressure sensors may be arranged upstream and downstream of the at least one filter so that the difference in the pressures upstream and downstream of the at least one filter can be detected. If the differential pressure exceeds a predetermined value, filter cleaning can be initiated.

In addition to time-controlled and/or sensor-controlled initiation of filter cleaning, provision may also be made for the latter to be initiated manually. This allows the user to manually initiate a filter cleaning process when required, independently of sensor signals and time-controlled filter cleanings.

The suction unit is at least temporarily provided with supply energy from the rechargeable battery device. The at least one battery gradually becomes discharged during operation of the vacuum cleaner. In order to extend the discharge time as long as possible, it is advantageous for the suction unit to consume as little energy as possible during normal suction operation. To enhance the filter cleaning effect, the supply energy provided to the suction unit is increased before the external air valve transitions to the open valve position, and the supply energy is reduced again later. The suction unit thus only has a relatively high energy consumption when the at least one filter is being cleaned. The operating time of the battery-driven vacuum cleaner can thereby be extended. The increased supply energy can be provided to the suction unit by a battery. However, an additional charge storage device may also be used, with this then being used as a supplement to a battery in order to boost the supply energy to the suction unit for filter cleaning. In particular, a capacitor, preferably a double-layer capacitor, may be used as the additional charge storage device. The capacitor can be charged gradually during normal suction operation, and the amplitude of the charging current can be selected to be relatively low so that, when using battery-powered operation, the load placed on the battery due to the charging of the capacitor is only low. For filter cleaning, the capacitor can be discharged within a short time, thereby providing energy to the suction unit for boosting the suction power.

Preferably, the suction power of the suction unit is capable of being varied depending on the valve position of the external air valve only when the vacuum cleaner is running on battery power. In such a configuration of the vacuum cleaner, the suction power is independent of the valve position of the external air valve while running on mains power, whereas it is varied depending on the valve position of the external air valve when running on battery power to thereby extend the operating time of the vacuum cleaner when on battery power.

The following description of preferred embodiments of the invention serves to explain the invention in greater detail in conjunction with the drawings.

DETAILED DESCRIPTION OF THE INVENTION

Figure 1:
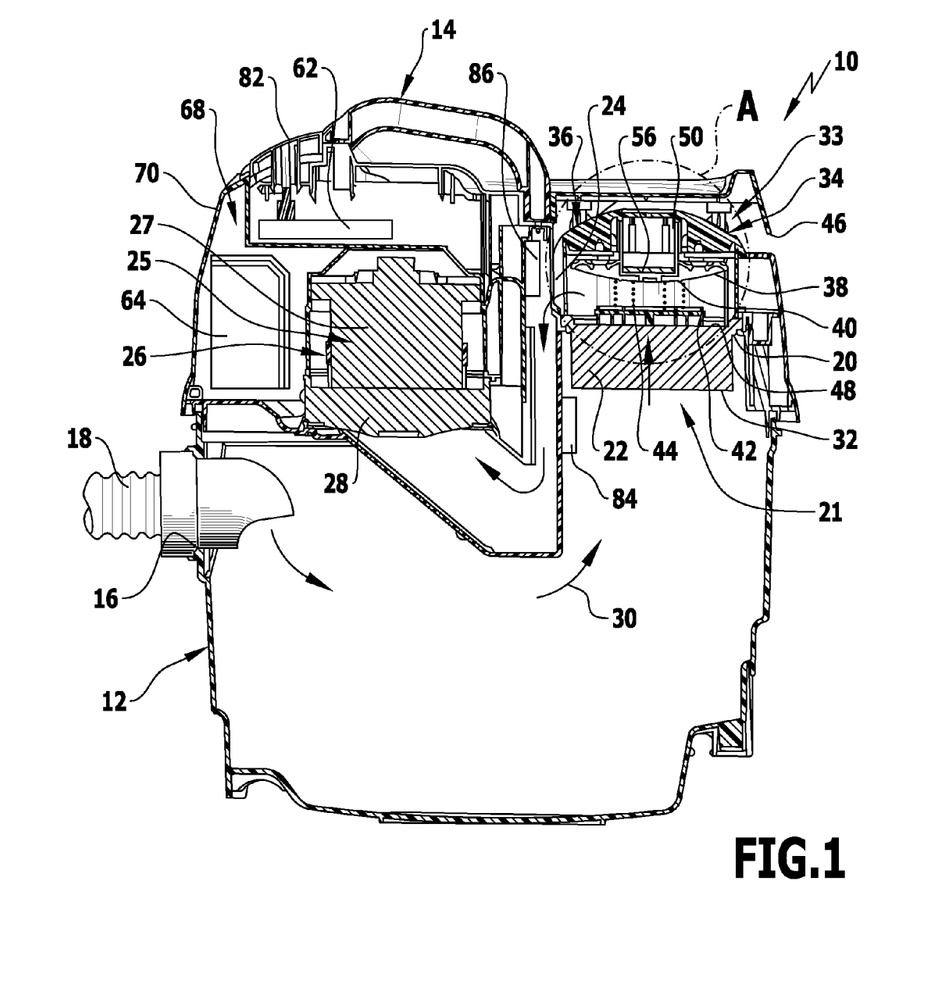
FIG. 1 is a schematic sectional view of an exemplary embodiment of a vacuum cleaner constructed in accordance with the invention.

An embodiment of a vacuum cleaner 10, which is shown schematically in a sectional view in FIG. 1, has a dirt collection container 12 on which a suction head 14 is mounted. The dirt collection container 12 has a suction inlet 16 to which a suction hose 18 can be connected in the usual manner. The suction head 14 seals off the dirt collection container 12 on the upper side thereof and forms a suction outlet 20 on which is held a filter device 21 having (at least) one filter 22. Adjoining the filter 22 is a suction conduit 24 via which the dirt collection container 12 is in flow communication with a suction unit 26. The suction unit 26 comprises an electric motor device 25 having (at least) one electric motor 27 and a fan 28 driven in rotation by the electric motor 27.

In operation of the vacuum cleaner 10, the suction unit 26 applies a negative pressure to the dirt collection container 12 so that a suction flow represented by arrows 30 in FIG. 1 is formed. Under the action of the suction flow 30, dirt-laden suction air can be drawn in via the suction inlet 16 into the dirt collection container 12, from where it can be sucked off by the suction unit 26. The suction air can be expelled to the surroundings by the suction unit 26 via exhaust air openings in the suction head 14, which are known per se to the person skilled in the art and not shown in the drawing.

The suction air flows through the filter 22 so that entrained solid particles are deposited on the dirty side 32 of the filter 22 facing towards the dirt collection container 12. Therefore, the filter 22 needs to be cleaned from time to time; otherwise, it develops increasing resistance to flow, whereby the suction effect of the vacuum cleaner 10 is adversely affected.

For cleaning the filter 22, an external air valve device 33 having (at least) one external air valve 34 (shown enlarged in FIG. 2) is arranged above the filter 22 in the suction head 14. It comprises a valve holder 36 which is held stationary in the suction head 14 and thin's a valve seat for a movable valve body in the form of a valve disk 38. The valve disk 38 is biased in a direction towards the valve holder 36 by a closing force provided by a closing spring 40. The closing spring 40 is clamped between a plate-like filter holder 42 which has a plurality of flow passages and is held stationary in the suction head 14, and the valve disk 38. In addition to the closing spring 40, the filter holder 42 carries a resilient stop element in the form of a stop spring 44. In particular (and preferably like the closing spring 40), the stop spring 44 has a linear characteristic. It is formed as a coil spring for example. Unlike the closing spring 40, the stop spring 44 is not biased in the closed position of the valve disk 38. Only when the valve disk 38 lifts off the valve seat of the valve holder 36 does the stop spring 44 come into contact with the underside of the valve disk 38, and continued movement of the valve disk 38 causes the stop spring 44 to be compressed somewhat. It thereby exerts an increasing restoring force on the valve disk 38 and accelerates the movement of the valve disk 38 from its closed valve position (shown in FIG. 2) via an open valve position and back to the closed valve position.

Figure 2:
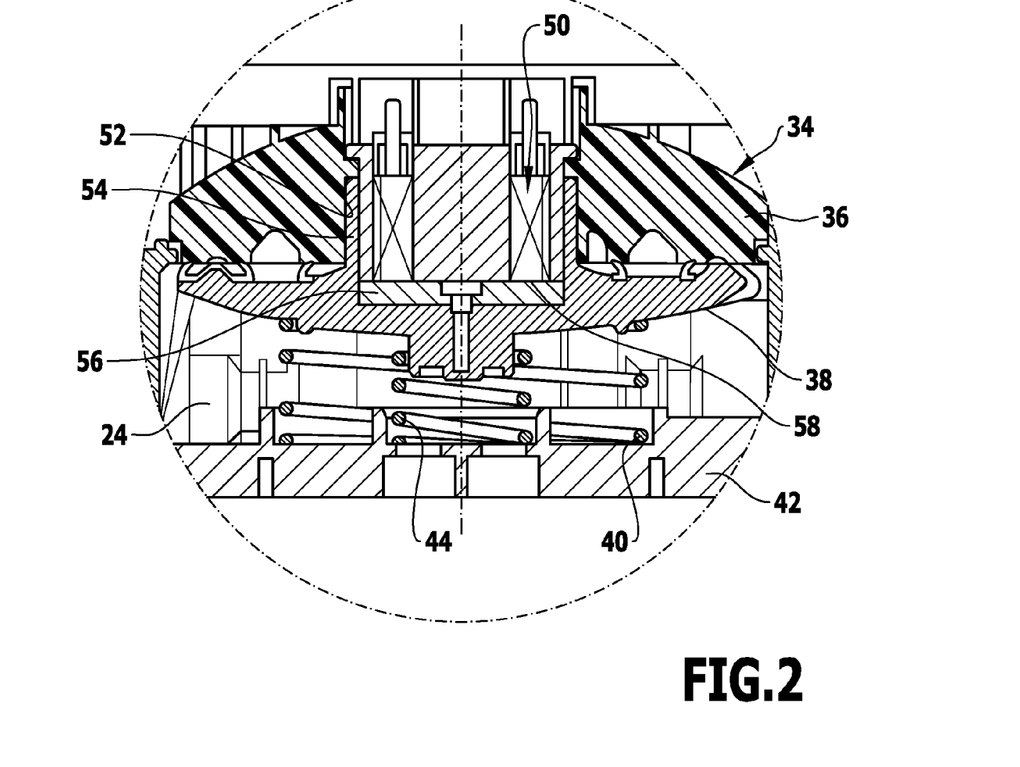
FIG. 2 is an enlarged representation of an external air valve device of the vacuum cleaner in accordance with FIG. 1.

In the open valve position, the valve disk 38 assumes a position at a distance from the valve holder 36, which forms the valve seat.

The valve holder 36 has a plurality of through-openings, not shown in the drawing, the mouth regions of which are closed off by the valve disk 38 when the latter assumes its closed valve position. At a level of the valve holder 36, the suction head 14 has a lateral opening 46. External air can flow into the through-openings of the valve holder 36 via the lateral opening 46. When the valve disk 38 assumes its open valve position spaced relative to the valve holder 36, the lateral opening 46 is in flow communication with the suction conduit 24 via the through-openings of the valve holder 36 and external air can be applied to the clean side 48 of the filter 22 facing away from the dirt collection container 12. When the valve disk 38 assumes its closed valve position, the flow communication between the lateral opening 46 and the suction conduit 24 is interrupted.

In a central region, the valve holder 36 carries an electromagnet 50. The electromagnet 50 is surrounded in a circumferential direction by an annular space 52 which has extending thereinto a guide sleeve 54 integrally formed on the valve disk 38 on the upper side thereof. The guide sleeve 54 receives a magnetizable element, for example in the form of an iron plate 56, which in the closed valve position of the valve disk 38 contacts a free end edge 58 of the electromagnet 50 and in combination with the electromagnet 50 forms a closed magnetic circuit.

Figure 3:
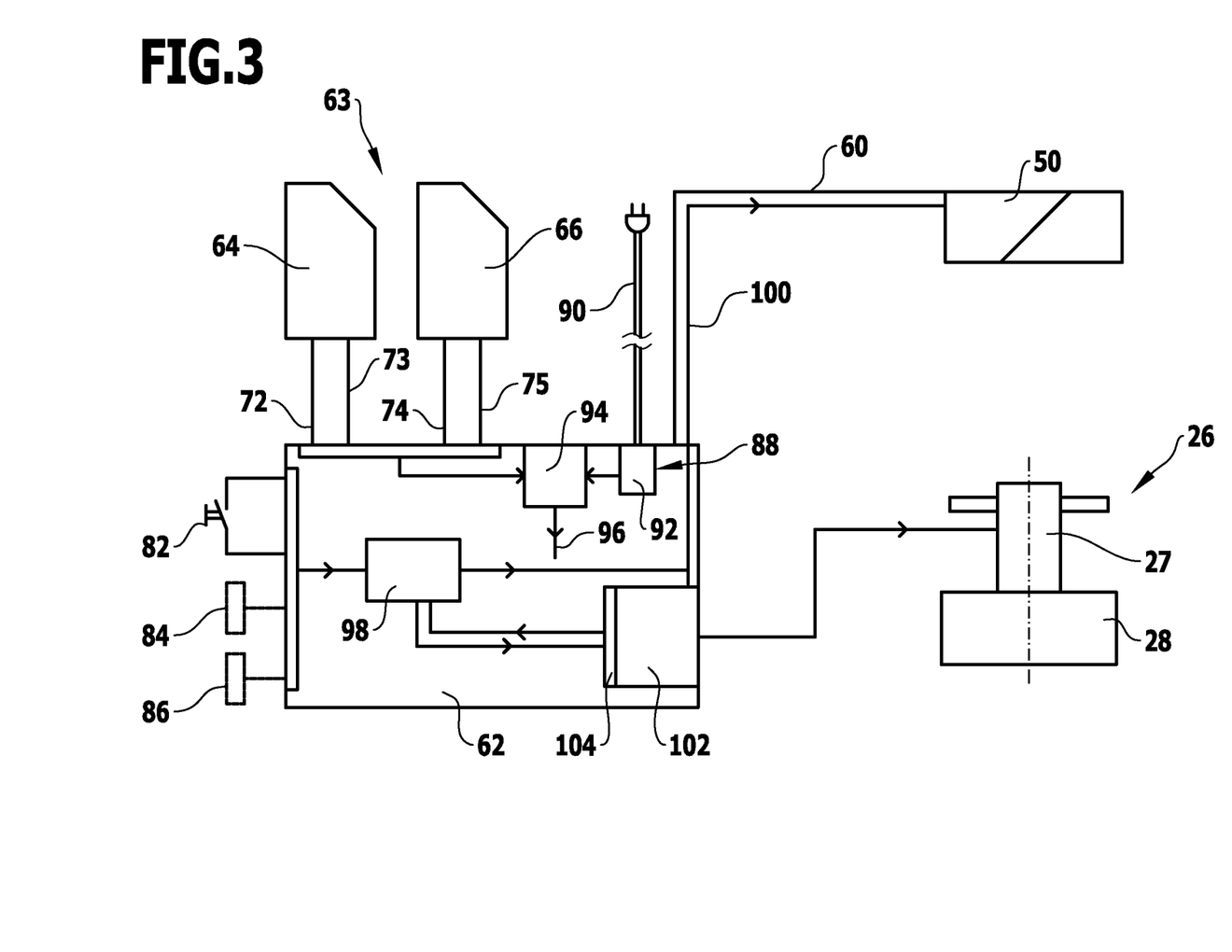
FIG. 3 is a block diagram of a control device of the vacuum cleaner in accordance with FIG. 1.

The electromagnet 50 is in electrical communication, via a current supply line 60, with a(n) (electronic) control device 62 arranged in the suction head 14 (FIG. 3). During normal suction operation of the vacuum cleaner 10, a supply current is applied to the electromagnet 50 by the control device 62. As a result of the magnetic field generated thereby, the valve disk 38 is reliably held in its closed position. The holding force of the electromagnet 50 is assisted by the spring force of the closing spring 40.

If the supply of current to the electromagnet 50 from the control device 62 is interrupted, then the magnetic holding force acting on the valve disk 38 does not occur and the valve disk 38 is lifted off the valve seat against the action of the closing spring 40 due to the pressure difference acting on the valve disk 38, said pressure difference resulting from the difference between the outside pressure of the external air in the region of the valve holder 36 and the inside pressure within the suction conduit 24. A sudden burst of external air is then allowed to pass through the through-openings of the valve holder 36 and into the suction conduit 24, and the external air is applied to the clean side 48 of the filter 22 in a sudden burst. This causes a mechanical shock to be applied to the filter 22. Furthermore, external air passes through the filter 22 in counterflow direction, i.e. counter to the flow direction 30 during normal suction operation. As a result, effective cleaning of the filter 22 is achieved.

Energy supply for the vacuum cleaner 10 is provided by a rechargeable battery device 63. This comprises for example two rechargeable batteries 64, 66. The battery device 63 comprises for example one or more lithium-ion accumulators. These are arranged laterally beside the suction unit 26 in a battery compartment 68 of the suction head 14. The battery compartment 68 is accessible to the user for exchange of the batteries 64, 66 via a swing-out door 70.

The electronic control device 62 is arranged in the suction head 14 above the suction unit 26 and is in electrical communication with the batteries 64 and 66 via supply lines 72, 73, 74, 75. At the input side, the control device 62 has connected thereto a push button 82 that can be manually actuated by the user and is arranged on the upper side of the suction head 14. The user can (manually) initiate a filter cleaning process by actuating the push button 82.

The battery device may also comprise a fan device for cooling the rechargeable batteries 64, 66 (not shown in the drawing). When accumulators that need to be cooled are used as batteries, this then allows for operation of the battery device to be implemented in a manner that is gentle on the accumulators. The fan device in turn receives its electrical energy for operation preferably from the batteries 64, 66 when running on battery power.

In an embodiment, the electronic control device 62 is arranged on a circuit board. Further, the circuit board has arranged thereon a receptacle for the battery device 63. In particular, the receptacle receives the batteries 64, 66. A fan device of the battery device 63 can also be arranged in the receptacle.

The control device 62 further comprises electronics for controlling and/or monitoring the battery device 63. By virtue of the control device 62, which controls the electric motor device 25, it is for example possible to control the fan device in such a manner that the latter is operated corresponding to the control of the electric motor device 25. By way of example, turning off the electric motor 27, which is controlled by the control device 62, also turns off the fan device (optionally after a time delay). It is for example also possible for the fan device to be turned off when filter cleaning is performed.

Furthermore, a control process can then be performed via the control device 62 which allows operating the battery device 63 in a gentle manner while optimizing for maximizing battery capacity. For example, a process of charging the battery device 63 can then also be appropriately controlled or monitored via the control device 62. Furthermore, the "ageing" process of the battery device 63 can be monitored via the control device 62.

Alternatively or additionally, provision may be made for a first pressure sensor 84 to be arranged upstream of the filter 22 and for a second pressure sensor 86 to be arranged downstream of the filter 22, these being signally and operatively connected to the control device 62 and each providing a pressure-dependent control signal. By use of the two pressure sensors 84 and 86, the pressure difference that occurs at the filter 22 can be determined. The more solid particles are deposited on the filter 22, the greater is the flow resistance of the filter 22 and the greater is the resulting pressure difference. When the pressure difference reaches a predeterminable value, the control device 62 can automatically initiate filter cleaning.

Alternatively or additionally, provision may be made for the control device 62 to automatically initiate filter cleaning independently of the existing pressure conditions and independently of the possible actuation of the push button 82 at constant or varying time intervals.

As has already been mentioned, filter cleaning is accomplished by momentarily interrupting the supply of current to the electromagnet 50 by the control device 62.

The time-related course of the supply current that is provided to the electromagnet 50 by the control device 62 is described in PCT/EP2011/052039, filed on Feb. 11, 2011, which is incorporated herein and made part hereof by reference: At a point in time $t_2$ (see FIG. 4 in PCT/EP2011/052039), the supply of current to the electromagnet 50 is interrupted so that the external air valve 34, starting from its closed valve position, transitions to its open valve position, and at a subsequent point in time $t_3$ the supply of current to the electromagnet 50 is re-established so that the external air valve 34 resumes its closed valve position. In the illustrated exemplary embodiment, the supply of current is interrupted three times in rapid succession so that a sudden burst of external air is applied to the clean side 48 of the filter 22 three times in succession and a substantial portion of said external air is passed through the filter 22 in counterflow direction. This causes solid particles adhering to the dirty side 32 to be dislodged therefrom. The filter cleaning process is completed at the end of the third current interruption, i.e., at the point in time $T_E$.

In such an exemplary embodiment, a complete cleaning process therefore comprises three opening and closing movements of the external air valve in rapid succession. The length of the time interval between the points in time $t_2$ and $t_3$ may for example be 90 milliseconds. Following a filter cleaning process, normal suction operation resumes by supply current being applied to the electromagnet 50 by the control device 62 and by the external air valve 34 maintaining its closed valve position. During normal suction operation, the suction power of the suction unit 26 is kept constant. In time-controlled filter cleaning, a period of suction operation of for example 15 seconds is followed by another filter cleaning process in which external air is supplied three times in sudden bursts, as explained above. Preferably, the length of the time interval between two filter cleaning processes is capable of being adjusted manually. Alternatively or additionally, a filter cleaning process can be initiated manually by the push button 82 and/or in a sensor-controlled manner by the pressure sensors 84, 86.

The vacuum cleaner 10 comprises a mains voltage supply device 88 (FIG. 3) by which the vacuum cleaner 10 can optionally or adjustably be supplied with mains current for its energy supply. FIG. 3 indicates an associated mains cable, designated by the reference numeral 90. It is then possible for a user to select whether energy is supplied via the mains voltage supply device 88 or the battery device 63.

The mains voltage supply device 88 comprises a rectifier 92 which provides direct current or direct voltage at an output thereof.

The control device 62 has a supply subunit 94 via which the components of the vacuum cleaner 10 are supplied with electrical energy. The supply subunit 94 provides the required electrical energy to the electromagnet 50 via the current supply line 60. It provides the electrical energy for powering the control device 62. It provides the electrical energy for controlling and actuating the electric motor 27. The corresponding electrical energy is delivered at an output (indicated at 96 in FIG. 3).

The supply subunit 94 can be formed by the battery device 63 or by the mains voltage supply device 88. It may also comprise a switch or the like which is used to manually or automatically adjust whether the vacuum cleaner 10 is supplied with energy from the rechargeable battery device 63 or from the mains voltage supply device 88.

The control device 62 comprises an external air valve control subunit 98. This is signally and operatively connected to the push button 82, the first pressure sensor 84 and the second pressure sensor 86. These provide corresponding signals to the external air valve control subunit 98, which then correspondingly controls the electromagnet 50 via a signal line 100. The external air valve control subunit 98 controls the electromagnet 50 in such a manner that the magnetic holding force acting on the valve disk 38 is released and hence a filter cleaning process is performed when a manual initiation process by the push button 82 is detected. Correspondingly, a filter cleaning process is also initiated when a pressure difference as measured between the first pressure sensor 84 and the second pressure sensor 86 for example exceeds a threshold value and/or when a certain time interval has elapsed. The external air valve control subunit 98 provides for automatic filter cleaning.

The electric motor 27 is in particular a permanent magnet-excited synchronous motor. In a permanent magnet-excited synchronous motor, the rotor has a plurality of permanent magnets. A stator is provided with coils which are controlled by the control device 62. The control is such that an electronic commutation process takes place. To this end, the control device 62 has (at least) one controller 102 which correspondingly controls the electric motor 27 and in particular the coils in the stator of the electric motor 27.

Control of the electric motor 27 by the controller 102 is in particular by pulse width modulated signals. The electric motor 27 is thereby supplied with the corresponding energy by control signals.

The electric motor 27 is in particular a brushless permanent magnet motor (EC motor). Using such a motor can achieve rotational speeds of for example 20,000 rpm or more with high efficiency and low noise. (Lower rotational speeds can also be achieved.)

In an exemplary embodiment, the electric motor is a three-phase motor and in particular a permanent magnet-excited three-phase synchronous motor. Provision may also be made for the permanent magnet-excited synchronous motor as the electric motor 27 to be only single-phase or two-phase.

The control device 62 comprises a motor control subunit 104 which is in particular part of the controller 102 and is signally and operatively connected to the external air valve control subunit 98. In principle, a unidirectional connection may be provided in which either the external air valve control subunit 98 provides the motor control subunit 104 with corresponding signals which characterize whether or not a filter cleaning process is performed, or the motor control subunit 104 provides the external air valve control subunit 98 with signals regarding the motor control of the electric motor 27. A bidirectional data connection may also exist in which motor control data and external air valve control data are exchanged between the external air valve control subunit 98 and the motor control subunit 104.

It is thereby possible for a corresponding external air valve control to be taken into account directly in the motor control. Alternatively or additionally, it is possible for motor control data to be taken into account in the external air valve control.

It may be useful for the suction power of the suction unit 26 to be increased during a filter cleaning process by corresponding control of the electric motor 27. This allows an elevated negative pressure to be created within the dirt collection container 12 when a filter cleaning process is performed. Such an increase in suction power is for example performed before each interruption of the supply current to the electromagnet 50 or during an entire filter cleaning process (in the time interval between the point in time $t_1$ and the point in time $t_E$). By virtue of the signal exchange between the external air valve control subunit 98 and the motor control subunit 104, the filter cleaning process and the electric motor 27 can be controlled such that departure from a working point due to the filter cleaning process is prevented.

In principle, a single controller 102 may be provided.

Figure 4:
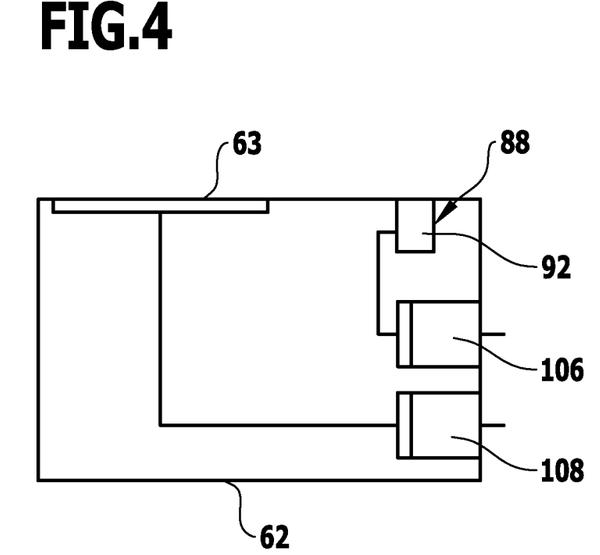
FIG. 4 is a partial view of a variant of the control device in accordance with FIG. 3.

If it is possible for the energy supply of the electric motor 27 to be provided alternatively via the battery device 63 and the mains voltage supply device 88, it is advantageous (see FIG. 4) for a first controller 106 to be provided which is associated with the mains voltage supply device 88 and for a second controller 108 to be provided which is associated with the battery device 63. In principle, the respective controllers operate as described above for the controller 102. If the supply of energy to the electric motor is via the mains voltage supply device 88, then the first controller 106 controls the electric motor 27. If energy supply is via the battery device 63, then the second controller 108 controls the electric motor 27.

Where separate controllers 106 and 108 are provided, the supply of energy via mains voltage and via the battery device 63 can be handled separately and the controllers can be optimized separately with respect thereto. It is thereby possible to make use of commercially available components.

Figure 5:
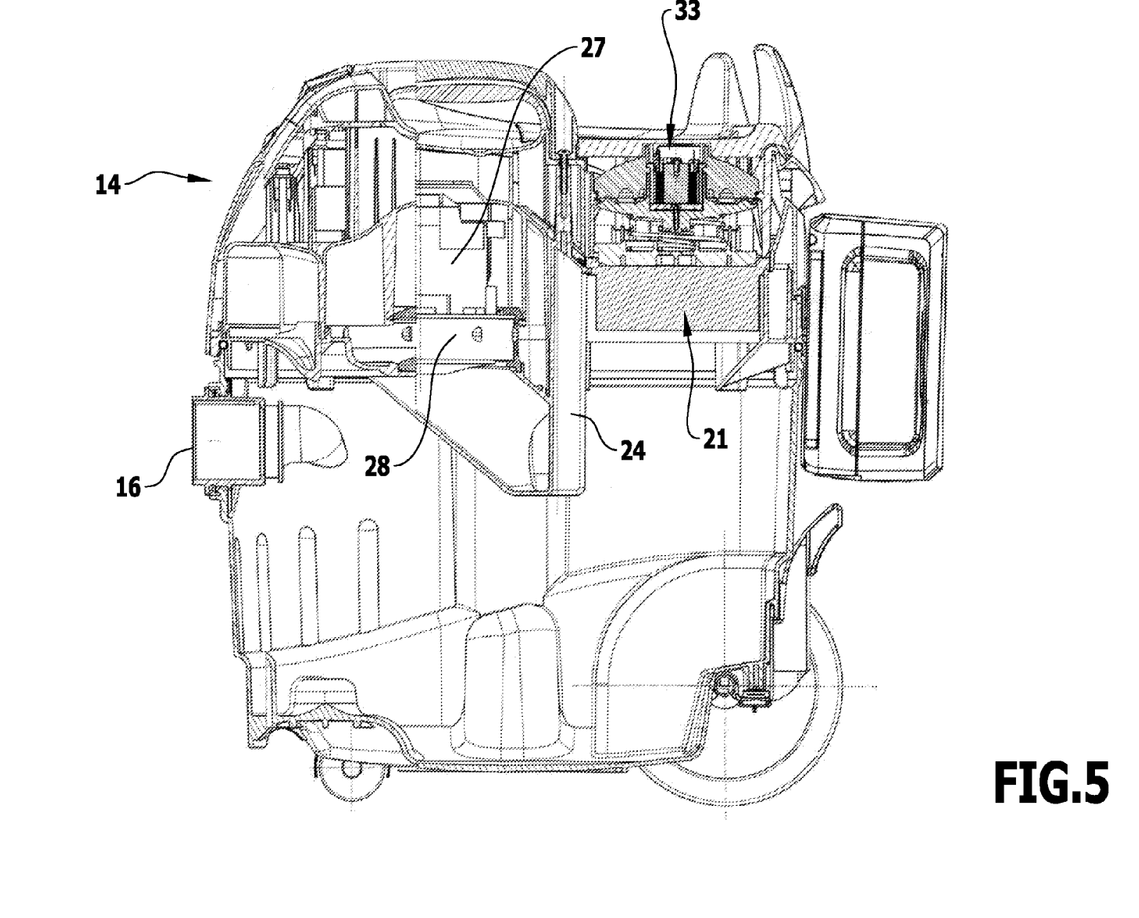
FIG. 5 is a schematic sectional view of a further exemplary embodiment of a vacuum cleaner constructed in accordance with the invention.
Figure 6:
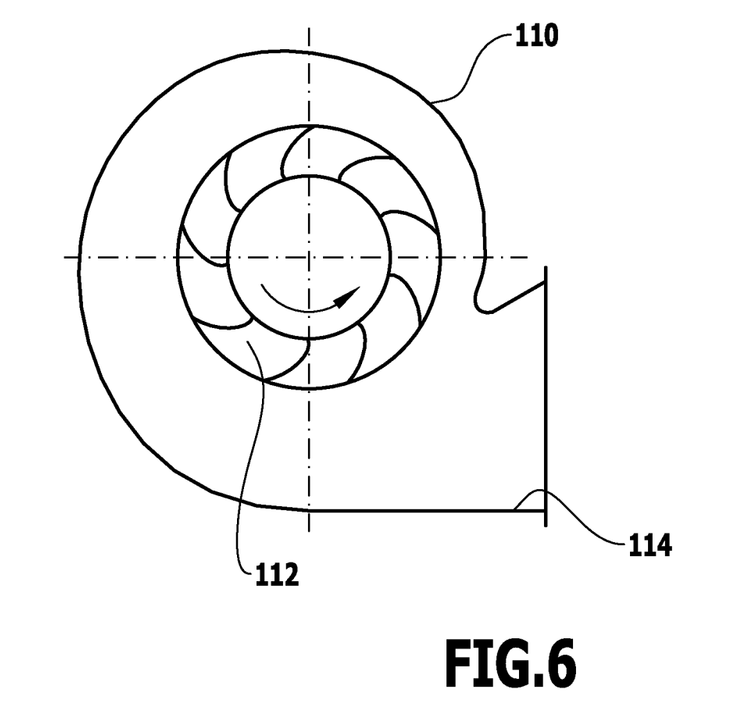
FIG. 6 is a sectional view of an exemplary embodiment of a volute housing.

In an embodiment (FIGS. 5 and 6), provision is made for the fan 28 to comprise a volute housing 110. Arranged in the volute housing 110 is an impeller 112. The impeller 112 is driven by the electric motor 27 and is for example connected to and rotationally fixed with respect to the rotor of the electric motor 27. An inlet region 114 of the volute housing 110 is arranged tangentially thereto. Said inlet region 114 is fluidly and operatively connected to the suction conduit 24.

The vacuum cleaner 10 in accordance with the invention operates as follows. The vacuum cleaner 10 can be operated independently of mains current via the battery device. The battery device 63 supplies electrical energy to the suction unit 26 and in particular to the electric motor 27 independently of mains power for performing suction operations.

A typical area of application for mains-independent vacuum cleaners 10 is a construction site, for example a building under construction, where there is no socket-outlet in a work area. In such applications, the material to be vacuumed often contains a high amount of fine dust. The external air valve device 33 is provided for filter cleaning. This is also powered via the battery device 63 independently of mains power. Optimized operation of the vacuum cleaner 10 is thereby possible independently of mains power; suction operation is possible and filter cleaning is performed manually and in particular automatically as required.

By the use of a permanent magnet-excited synchronous motor which is electronically commutated, it is possible to achieve high efficiency, i.e. energy consumption of the electric motor 27 can be kept low.

Using the volute housing 110 is another way of achieving a high degree of efficiency in terms of suction power, thereby extending running time.

In an electronically commutated permanent magnet-excited synchronous motor, control is effected via the controller 102 or controllers 106, 108. A simple linkage can thereby be implemented between the control of the filter cleaning process and the control of the electric motor 27. For example, the control device 62 then also prevents departure from the working point. This in turn allows optimized suction operation of the vacuum cleaner 10 while saving energy.

LIST OF REFERENCE CHARACTERS 10 vacuum cleaner
12 dirt collection container
14 suction head
16 suction inlet
18 suction hose
20 suction outlet
21 filter device
22 filter
24 suction conduit
25 electric motor device
26 suction unit
27 electric motor
28 fan
30 suction flow
32 dirty side
33 external air valve device
34 external air valve
36 valve holder
38 valve disk
40 closing spring
42 filter holder
44 stop spring
46 lateral opening
48 clean side
50 electromagnet
52 annular space
54 guide sleeve
56 iron plate
58 end edge
60 current supply line
62 control device
63 battery device
64 battery
66 battery
68 battery compartment
70 door
72 supply line
73 supply line
74 supply line
75 supply line
82 push button
84 first pressure sensor
86 second pressure sensor
88 mains voltage supply device
90 mains cable
92 rectifier
94 supply subunit
96 output
98 external air valve control subunit
100 signal line
102 controller
104 motor control subunit
106 first controller
108 second controller
110 volute housing
112 impeller
114 inlet region That which is claimed:

1. A vacuum cleaner, comprising:
a suction inlet;
a dirt collection container;
a filter device;
a suction conduit;
a suction unit;
wherein the dirt collection container is in flow communication with the suction unit via the filter device and the suction conduit; and
wherein the filter device has a negative pressure applied to it by the suction unit;
an external air valve device;
wherein the filter device is capable of having external air applied thereto on a clean side thereof via the external air valve device; and
wherein for cleaning the filter device the external air valve device is capable of being brought from a closed valve position to an open valve position and back again from the open valve position to a closed valve position; and a battery device for supplying energy to the external air valve device;

wherein a control device is provided which controls the cleaning of the filter device by the external air valve device, wherein the filter cleaning is initiated manually or automatically;

wherein the control device controls an electric motor device of the suction unit, and wherein the control device comprises a motor control subunit which is signally and operatively connected to an external air valve control subunit.

2. The vacuum cleaner in accordance with claim 1, wherein the battery device is rechargeable.

3. The vacuum cleaner in accordance with claim 1, wherein at least one of the vacuum cleaner and the suction unit are supplied with energy via the battery device.

4. The vacuum cleaner in accordance with claim 1, wherein a mains voltage supply device is provided for the vacuum cleaner.

5. The vacuum cleaner in accordance with claim 4, wherein the mains voltage supply device has the capability of adjusting or selecting whether energy is supplied via the battery device or via the mains voltage supply device.

6. The vacuum cleaner in accordance with claim 1, wherein the automatic initiating is at least one of time-dependent and depending on one or more sensor signals.

7. The vacuum cleaner in accordance with claim 1, wherein the motor control subunit provides for the electric motor device to be controlled such that a working point or a working point range of the electric motor device is maintained for a filter cleaning process of the filter device.

8. The vacuum cleaner in accordance with claim 1, wherein the control device and the battery device are coupled.

9. The vacuum cleaner in accordance with claim 8, wherein the control device at least one of controls and monitors at least one of the charging and discharging and operation of the battery device.

10. The vacuum cleaner in accordance with claim 8, wherein the control device comprises at least one controller for controlling the electric motor device.

11. The vacuum cleaner in accordance with claim 10, wherein the control device comprises a first controller which is associated with a mains voltage supply device and comprises a second controller which is associated with the battery device, wherein either the first controller or the second controller controls the electric motor device depending upon which energy supply is active.

12. The vacuum cleaner in accordance with claim 1, wherein a receptacle for the battery device is arranged on a circuit board on which is arranged an electronic control device for the electric motor device.

13. The vacuum cleaner in accordance with claim 1, wherein the suction unit comprises an electric motor device having at least one electric motor.

14. The vacuum cleaner in accordance with claim 13, wherein the at least one electric motor is a permanent magnet-excited synchronous motor.

15. The vacuum cleaner in accordance with claim 13, wherein the at least one electric motor is electronically commutated.

16. The vacuum cleaner in accordance with claim 13, wherein the at least one electric motor is a three-phase motor.

17. The vacuum cleaner in accordance with claim 1, wherein the suction unit comprises a volute housing with an impeller rotating in the volute housing.

* * * * *